United States Patent

[11] 3,625,284

| [72] | Inventors | William B. Gogarty<br>Littleton, Colo.;<br>Wilson L. Kinney, Findlay, Ohio; Walter B. Kirk, Jr., Robinson, Ill. |
|---|---|---|
| [21] | Appl. No. | 862,053 |
| [22] | Filed | Sept. 29, 1969 |
| [45] | Patented | Dec. 7, 1971 |
| [73] | Assignee | Marathon Oil Company<br>Findlay, Ohio |

[54] STIMULATION OF WATER INJECTION WELLS WITH MICELLAR DISPERSIONS
28 Claims, No Drawings

[52] U.S. Cl. .................................................. 166/273, 166/307
[51] Int. Cl. .................................................. E21b 43/22, E21b 43/27
[50] Field of Search ...................................... 166/307, 305, 274, 273, 275; 252/8.55

[56] References Cited
UNITED STATES PATENTS

| 2,356,205 | 8/1944 | Blair, Jr. et al. | 166/305 UX |
| 3,330,344 | 7/1967 | Reisberg | 166/274 |
| 3,467,188 | 9/1969 | Gogarty | 166/274 |
| 3,474,865 | 10/1969 | Gogarty et al. | 166/274 |
| 3,481,404 | 12/1969 | Gidley | 166/307 |
| 3,482,631 | 12/1969 | Jones | 166/273 |
| 3,483,923 | 12/1969 | Darley | 166/273 X |

Primary Examiner—Stephen J. Novosad
Attorneys—Joseph C. Herring, Richard C. Willson and Jack L. Hummel ABSTRACT: Stimulation of water injection wells is accomplished by injecting into the well 1–500 gallons of acid followed by the injection of 1–500 gallons of a micellar dispersion, the gallons of acid and dispersion based on vertical feet of oil-bearing formation. Preferably, the acid is followed by 0.5–50 volumes of water per volume of acid, i.e., a water slug is injected before the micellar solution.

STIMULATION OF WATER INJECTION WELLS WITH MICELLAR DISPERSIONS

BACKGROUND OF THE INVENTION

U.S. Pat. No. 3,254,714 to Gogarty et al., teaches injecting a micellar dispersion into a formation and displacing it therethrough to recover crude oil through a production means in fluid communication with the reservoir. Such a process is very effective in secondary and tertiary oil recovery methods.

U.S. Pat. No. 2,356,205 to Blair, et al. teaches that productivity of a producing well can be increased by removing wax-associated occlusions within the immediate vicinity of the well bore. This is accomplished by contacting the strata with a micellar solution, permitting the solution to solubilize the occlusions and backflowing the well to remove the objectionable occlusions up-hole.

The prior art also teaches that acidizing, e.g., with hydrochloric acid, tends to "open" the formation to larger flow rates of liquids. This is accomplished by dissolving carbonate deposited by the waters, chemically attacking or solubilizing undesirable materials, etc. to permit larger flows of fluid. In addition, the effect of acid may permit the flow of fluids into reservoir sections not presently taking fluids.

SUMMARY OF THE INVENTION

Applicants have discovered that the stimulation of water injection wells can be improved by preceding a slug of micellar solution with a slug of acid. For example, from about 1 to about 500 gallons or more of an acid per vertical foot of oil-bearing formation can precede the injection of from about 1 to about 500 gallons of a micellar solution per vertical foot of oil-bearing formulation and this, in turn, followed by water in the normal operation of a water-injection well. Preferably a slug of water is injected after the acid and before the micellar solution. Such a process will improve the injectivity index of the injection well, including the "opening" and flow of fluids through reservoir sections not previously receiving fluids. This process is also useful to increase the injectivity index of disposal wells. The terms "oil-bearing formation" should be replaced with "formation capable of receiving disposable fluids" where the invention is used with disposal wells.

DESCRIPTION OF THE INVENTION

Acids useful with this invention include any acid which will effectively increase the capability of the well to receive larger quantities of fluids. Examples of acids include those which will overcome at least some of the adversities due to deposits of carbonate, iron sulfide, gypsum, etc. or other undesired materials, e.g. waxes, asphalts, etc. Examples of useful acids include hydrochloric, nitric acid, hydrofluoric, sulfuric, citric, combination of nitric and hydrochloric (aqua regia), etc. The acids may contain water, e.g. 36–38 percent hydrochloric and the residue water. Sulfuric can be almost water free. The acid can contain sequestering agents, surface active agents, corrosion inhibitors, agents to lower the viscosity of the acid, deemulsifying agents, etc. The strength of the acid can vary and will depend on the type used. For example the strength of hydrochloric acid can be from about 5 to about 38 percent. Concentrations of lesser or larger amounts of acid are useful and such concentrations may depend upon the particular desires of the process user.

Generally from about 1 to about 500 gallons or more and preferably from about 2 to about 250 (especially with hydrochloric acid) gallons of the acid per vertical foot of the oil-bearing formation give improved results with this invention. Again, smaller amounts or larger amounts of the acid are also useful and such amounts will depend upon the desired economics and the conditions of the reservoir to obtain the most feasible dollar return for the money invested. Where concentrated hydrochloric acid is used, from about 5 to about 50 gallons per vertical foot of oil-bearing sand is useful to give good results in most wells.

The term "micellar dispersion" as used herein is meant to include micellar solutions, "microemulsions" [Schulman and Montagne, *Annals of the New York Academy of Sciences*, 92, pages 366–371 (1961)], "transparent" emulsions (Blair, Jr. et al., U.S. Pat. No. 2,356,205) and micellar dispersion technology taught by C. G. Summer, *Clayton's, The Theory of Emulsions and Their Technical Treatment*, 5th Edition, pp. 315–320 (1954). Examples of useful micellar dispersions include those taught in U.S. Pat. Nos. 3,254,714; 3,275,075; 3,301,325; 3,307,628; 3,330,344; and 3,348,611. The micellar dispersion can be oil-external or water-external.

The micellar dispersion is comprised of hydrocarbon, aqueous medium, and at least one surfactant. One or more cosurfactants (also identified as cosolvents, cosolubilizers, and semipolar organic compounds) are useful in the dispersions. Also, electrolytes are useful in the dispersions. The micellar dispersions are, for purposes of this invention, relatively stable dispersions and can show some Tyndall effect, but generally do not. They are mobile in the formation. Also, the micellar dispersions can contain other additives, e.g., corrosion and scale inhibitors, bactericides, etc. Examples of useful dispersions contain, by volume, from about 4 to about 85 percent hydrocarbon, from about 5 to about 90 percent water, at least about 4 percent surfactant, from about 0.01 to about 20 percent or more by volume of cosurfactant and from about 0.001 or less up to about 5 percent or more by weight of electrolyte in the aqueous phase.

Examples of useful hydrocarbon include crude oil (both sweet and sour), partially refined fractions thereof, e.g. side cuts from crude columns, crude column overheads, gas oils, kerosene, heavy naphthas, naphthas, straight run gasoline, and liquefied petroleum gases, refined fractions of crude oil, halogenated hydrocarbons, etc. Pure hydrocarbons are also useful, e.g., paraffinic compounds including liquefied petroleum gases, propane, pentane, heptane decane, dodecane, etc., cycloparaffin compounds including cyclohexane, etc. aryl compounds including mono as well as poly cyclic compounds, and substituted products thereof including toluene, alkyl phenols, etc. and combinations of the hydrocarbons taught herein. Based on economics, the preferred hydrocarbon is one locally available and is crude oil. The unsulfonated hydrocarbon (e.g. heavy vacuum gas oils) in petroleum sulfonates is also useful.

The aqueous medium can be soft, brackish, or brine water. Preferably, the water is soft but it can contain small amounts of salts which are preferably compatible with the ions in the subterranean formations being flooded.

Useful surfactants include the various nonionic, cationic, and anionic surfactants. Examples of surfactants can be found in U.S. Pat. No. 3,254,714 to Gogarty et al. Preferably, the surfactant is a petroleum sulfonate, also known as alkaryl sulfonates or alkaryl naphthenic sulfonates. The sulfonate can contain less than 60 or up to 100 percent active sulfonate. Examples of preferred surfactants are the sodium and ammonium petroleum sulfonates having an average equivalent weight within the range of from about 360 to about 520, and more preferably from about 400 to about 470. The surfactant can be a mixture of low and high average equivalent weight sulfonates or a mixture of different surfactants.

Examples of useful cosurfactants include alcohols, amino compounds, esters, aldehydes, ketones and like materials containing from one up to about 20 or more carbon atoms and more preferably from about three to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and secondary hexanols. Concentrations of from about 0.1 percent to more than about 5 percent by volume are preferred and more preferably from about 0.2 to about 3 percent. Mixtures of two or more cosurfactants are also useful.

Electrolytes useful within the micellar dispersions include inorganic bases, inorganic acids, inorganic salts, organic bases, organic acids, and organic salts. These electrolytes include those being strongly or weakly ionized. Preferably, the electrolytes are inorganic bases, inorganic acids, and inorganic salts, examples include sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in U.S. Pat. No. 3,330,344. The type and concentration of preferred electrolyte will depend on the hydrocarbon phase, aqueous phase, surfactant, cosurfactant, reservoir fluids and reservoir temperature.

The amount of acid and micellar dispersion injected into the formation depends upon the thickness of the oil-bearing rock or "pay" sand (that is, the permeable part of the formation containing crude oil in amounts feasible for recovering) the formation capable of receiving disposable fluids. Examples of formation thickness can vary from about 4 feet or less to about 3,000 feet and possibly higher. From about 1 to about 500 or more gallons of micellar dispersion per vertical foot of oil-bearing sand are useful with this invention. Larger quantities may be useful, however, the increased cost associated therewith generally is not favorable with the results as compared to smaller quantities. Also, smaller amounts may be used, but the indicated amounts are considered optimum for the process. Generally from about 25 to about 200 gallons of the micellar dispersion per vertical foot of oil sand give significant increases to the efficiency of water injection into an injection well. Generally, only that amount of micellar dispersion to displace substantially all of the oil from no more than the pore space adjacent the well bore to a distance of 3-20 feet is required.

The mobility of the acid flowing in the formation is preferably about equal to or greater than the mobility of the interstitial water. The mobility of the micellar dispersion is preferably about equal to or greater than the mobility of the formation fluids (i.e. interstitial water and oil) in the reservoir ahead of the dispersion. However, in certain cases it may be preferred that the mobilities of the acid and/or micellar dispersion may be less than that of the formation fluid.

Preferably, the acid and dispersion are injected into the formation at a pressure below the formation fracture pressure.

After injections of the acid and micellar dispersion are completed, water is injected into the formation through the injection well. The acid and/or micellar dispersion may be permitted to remain in contact with the sands immediately adjacent the well bore for sufficient time (e.g., up to 6 or more hours) to "act" on the reservoir rock, e.g. effect solubilization of paraffin, residual oil, etc. Contact times up to about one hour or more are preferred with the acid whereas the contact time can vary preferably up to about 6 hours or more for the micellar solution. Thereafter, water can be injected to displace the acid and dispersion out into the formation. Preferably, water is injected after the acid slug and before the micellar dispersion is injected—amounts within the range of from less than about 0.5 to about 50 volumes of water per volume of acid are useful.

Injectivity index as used herein is defined as the injection rate in barrels per day to the excess pressure above reservoir pressure which causes that injection rate. It can be defined by the formula Injectivity Index $I=q/(p_w-p_e)$ bbl./day/p.s.i.

wherein $P_w$ is the sand—face pressure, $P_e$ is the reservoir static pressure measured at a point about equal distance between the injection and producing wells and $q$ is the injection rate in bbl./day.

The following examples specifically illustrate working embodiments of the invention. It is not intended that the invention be limited to the specific components or procedures utilized. Rather, it is intended that all equivalents obvious to those skilled in the art be included within the scope of the invention as taught in the specification and appended claims. Unless otherwise specified, percents are based on volume.

EXAMPLE I

An injection well having a sand thickness of 25 feet, which has been cleaned out, swabbed, acidized with 200 gallons of 15 percent by weight hydrochloric and reswabbed, has a water injection rate of 30 barrels per day at 700 p.s.i.g. There is injected 504 gallons of a micellar dispersion composed of 55.3 percent crude column overheads, 10 percent of ammonium sulfonate (80 percent active), 2.0 percent isopropanol, 0.2 percent n-nonyl phenol, and 32.2 percent water containing about 1 percent by weight of sodium hydroxide. The micellar dispersion is injected at a rate not to exceed 10 barrels per hour. After the micellar dispersion is injected, water is injected and the water injection rate is 101 barrels per day at 650 p.s.i.g. This indicates an increase of 237 percent over the original injection rate.

EXAMPLE II

An injection well, oil-bearing sand thickness is 17 feet, is cleaned out and pressure acidized with 200 gallons of 15 percent by weight of hydrochloric acid at 500 p.s.i.g. 2,940 gallons of the micellar dispersion defined in example I are injected into the well. Before treatment with the acid and micellar dispersion, the water injection rate was 18 barrels per day at 700 p.s.i.g. After treatment with the acid and micellar dispersion, the injection rate increased to 50 barrels per day at 670 p.s.i.g. This indicates an increase of 178 percent over the original injection rate.

EXAMPLE III

An injection well has an injectivity index of 0.46. Sand thickness is about 27 feet. The injection well is first treated with 215 gallons of a cleaning agent (contains 5 gallons of Corexit, trademark of Enjay Chemical Co., and 210 gallons of water) is injected at 500 p.s.i.g. (below formation fracture pressure) and this followed by water. This increases the injectivity index to 2.1. Thereafter, 4.20 gallons of micellar dispersion per vertical foot of sand are injected into the well over a 16 hour period. The micellar dispersion is composed of 38.2 percent crude oil, 52 percent water, 8.0 percent active ammonium sulfonate and 1.8 percent primary amyl alcohol. Water is then injected into the well. The dispersion and water are injected at a pressure below the formation fracture pressure. The injectivity index of the well increased to 36.8, a percent increase of about 8,000 percent over the original injectivity index of the well and 1,650 percent over the injectivity index obtained by the acid preslug. This high injectivity index is being maintained during continuous injections of water.

What is claimed is:

1. A process for increasing the injectivity index of an injection well in a subterranean oil-bearing formation, the process comprising injecting into the formation an acid in an amount sufficient to increase the capability of the formation to receive larger quantities of water, injecting water into the formation, and then injecting into the formation a micellar dispersion in an amount sufficient to displace substantially all of the oil from no more than the pore space adjacent the well bore to a distance of from about 3 to about 20 feet.

2. The process of claim 1 wherein from about 1 to about 500 gallons of acid per vertical foot of oil-bearing formation is injected into the formation.

3. The process of claim 1 wherein from about 1 to about 500 gallons of the micellar dispersion per vertical foot of oil-bearing formation are injected into the formation.

4. The process of claim 1 wherein from about 0.5 to about 50 volumes of water per volume of acid are injected into the formation.

5. The process of claim 1 wherein water is immediately injected after the micellar dispersion is injected into the formation.

6. The process of claim 1 wherein the acid and/or micellar dispersion are permitted to remain in contact with the formation for a period of time up to about 6 hours before water is injected into the formation.

7. The process of claim 1 wherein the acid is permitted to remain in contact with the formation for a period of time up to about 1 hour before water is injected into the formation.

8. The process of claim 1 wherein from about 25 to about 200 gallons per vertical foot of formation of the micellar dispersion are injected into the formation.

9. The process of claim 1 wherein the micellar dispersion is water-external.

10. The process of claim 1 wherein the micellar dispersion is oil-external.

11. The process of claim 1 wherein the micellar dispersion is comprised of hydrocarbon, water, and surfactant.

12. The process of claim 11 wherein the micellar dispersion contains cosurfactant and/or electrolyte.

13. The process of claim 1 wherein the mobilities of the acid and the micellar dispersion flowing in the formation are equal to or greater than the mobility of the formation fluid flowing ahead of the micellar dispersion.

14. The process of claim 1 wherein the acid and the micellar dispersion are injected into the formation at a pressure less than the formation fracture pressure.

15. The process of claim 1 wherein the mobility of the acid is about equal to or greater than the mobility of interstitial water flowing in the formation.

16. The process of claim 1 wherein the mobility of the micellar dispersion is about equal to or greater than the mobility of formation fluids flowing in the formation.

17. A process of recovering crude oil from an oil-bearing subterranean formation having an injection means in fluid communication with a production means, the process comprising injecting into the formation about 1 to about 500 gallons of acid, then injecting about 0.5 to about 50 volumes of water per volume of acid, and thereafter injecting about 1 to about 500 gallons of micellar dispersion, the gallons of acid and micellar dispersion based on each vertical foot of oil-bearing formation, and then injecting sufficient water into the injection means to displace the acid and micellar dispersion out into the formation and recovering crude oil through the production means.

18. The process of claim 17 wherein from about 2 to about 250 gallons of acid per vertical foot of oil-bearing formation is injected into the formation.

19. The process of claim 17 wherein the acid is selected from the group consisting of hydrochloric, nitric, sulfuric, hydrofluoric, citric, and a combination of nitric and hydrochloric.

20. The process of claim 17 wherein from about 25 to about 200 gallons per vertical foot of formation of the micellar dispersion are injected into the formation.

21. The process of claim 17 wherein the micellar dispersion is oil-external.

22. The process of claim 17 wherein the micellar dispersion is water-external.

23. The process of claim 17 wherein the micellar dispersion is comprised of hydrocarbon, aqueous medium, and surfactant.

24. The process of claim 23 wherein the micellar dispersion contains surfactant and/or electrolyte.

25. The process of claim 17 wherein the acid and/or the micellar dispersion are permitted to remain in contact with the formation in the immediate vicinity of the well bore for a period of time up to about 6 hours before being displaced out into the formation.

26. A process of increasing the injectivity index of a disposal well, the process comprising injecting into the disposal well about 1 to about 500 gallons of acid, then injecting about 0.5 to about 50 volumes of water per volume of the injected acid, and then injecting into the well about 1 to about 500 gallons of micellar dispersion, the gallons of acid and micellar dispersion based on each vertical foot of formation capable of receiving disposable fluids, and thereafter continuing the injection of disposable fluids into the well.

27. The process of claim 26 wherein from about 0.5 to about 50 volumes of water per volume of acid are injected into the well before the micellar dispersion is injected.

28. The process of claim 26 wherein the acid and/or micellar dispersion are permitted to remain in contact with the formation in the immediate vicinity of the well bore for a period of time up to about 6 hours before being displaced out into the formation.

* * * * *

UNITED STATES PATENT OFFICE
CERTIFICATE OF CORRECTION

Patent No. 3,625,284      Dated 12/7/71

Inventor(s) W. B. Gogarty et al

It is certified that error appears in the above-identified patent and that said Letters Patent are hereby corrected as shown below:

Col. 1, line 34:      Delete "formulation" and insert --formation--.

Col. 2, line 36:      Insert --,-- after "heptane".

Col. 3, lines 17-18:      After "recovering)" insert --or the thickness of--.

Signed and sealed this 9th day of May 1972.

(SEAL)
Attest:

EDWARD M. FLETCHER, JR.
Attesting Officer

ROBERT GOTTSCHALK
Commissioner of Patents